US008476837B2

(12) United States Patent
Vos

(10) Patent No.: US 8,476,837 B2
(45) Date of Patent: Jul. 2, 2013

(54) TRANSISTOR LADDER NETWORK FOR DRIVING A LIGHT EMITTING DIODE SERIES STRING

(75) Inventor: Martin J. Vos, Minneapolis, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 295 days.

(21) Appl. No.: 12/829,611

(22) Filed: Jul. 2, 2010

(65) Prior Publication Data
US 2012/0001558 A1 Jan. 5, 2012

(51) Int. Cl.
*H05B 37/00* (2006.01)
*H05B 39/00* (2006.01)
*H05B 41/00* (2006.01)
*H05B 37/02* (2006.01)
*H05B 39/04* (2006.01)
*G05F 1/00* (2006.01)

(52) U.S. Cl.
USPC ........ 315/193; 315/122; 315/185 R; 315/224; 315/291; 315/312

(58) Field of Classification Search
USPC .............................. 315/193, 122, 185 R, 224
See application file for complete search history.

(56) References Cited

U.S. PATENT DOCUMENTS

| | | | |
|---|---|---|---|
| 5,552,678 A | 9/1996 | Tang et al. | |
| 6,144,222 A | 11/2000 | Ho | |
| 6,359,392 B1 | 3/2002 | He | |
| 6,690,146 B2 | 2/2004 | Burgyan et al. | |
| 6,728,121 B2 | 4/2004 | Ben-Yaakov | |
| 7,081,722 B1 | 7/2006 | Huynh et al. | |
| 7,239,087 B2 | 7/2007 | Ball | |
| 7,439,944 B2 | 10/2008 | Huynh et al. | |
| 7,489,086 B2 | 2/2009 | Miskin et al. | |
| D627,085 S | 11/2010 | Duan et al. | |
| D629,929 S | 12/2010 | Chen et al. | |

(Continued)

FOREIGN PATENT DOCUMENTS

| CN | 201312402 | 9/2009 |
|---|---|---|
| JP | 2001-313424 | 11/2001 |

(Continued)

OTHER PUBLICATIONS

Cheung, "Determination of LED Equivalent Circuits Using Network Analyser Measurements", IEEE Optoelectronic and Microelectronic Materials Devices, 1999, pp. 232-235.

(Continued)

*Primary Examiner* — Shawki Ismail
*Assistant Examiner* — Dylan White

(57) ABSTRACT

Ladder network circuits for controlling operation of a string of light emitting diodes (LEDS). The circuits include a number of sections connected in series. Each section includes one or more LED junctions, a variable resistive element coupled to the LED section, and a switch coupled to the variable resistive element and the LED section for controlling activation of the LED. The sections can include a transistor coupled between the switch and variable resistive element. The series of sections are connected to an AC power source, rectifier, and dimmer circuit. When receiving power from the power source, the sections activate the LEDs in sequence throughout the series of the sections. The dimmer circuit controls activation of a selection of one or more of the sections in order to activate in sequence the LEDs in only the selected sections, providing for both dimming and color control of the LEDs.

18 Claims, 4 Drawing Sheets

U.S. PATENT DOCUMENTS

| | | |
|---|---|---|
| D633,226 S | 2/2011 | Katsaros |
| D634,451 S | 3/2011 | de Visser |
| D642,704 S | 8/2011 | Hagens |
| 8,164,276 B2 | 4/2012 | Kuwabara |
| 2004/0037087 A1 | 2/2004 | Desai |
| 2005/0173719 A1 | 8/2005 | Yonekubo et al. |
| 2005/0212501 A1 | 9/2005 | Acatrinei |
| 2007/0069664 A1* | 3/2007 | Robinson et al. ............. 315/312 |
| 2007/0070645 A1 | 3/2007 | Coushaine et al. |
| 2007/0152604 A1 | 7/2007 | Tatsumi |
| 2007/0188114 A1 | 8/2007 | Lys |
| 2007/0258176 A1* | 11/2007 | Ball et al. ..................... 361/56 |
| 2008/0252229 A1 | 10/2008 | Wu |
| 2009/0034283 A1 | 2/2009 | Albright et al. |
| 2009/0066267 A1 | 3/2009 | Kraus et al. |
| 2009/0174337 A1 | 7/2009 | Miskin et al. |
| 2009/0174343 A1 | 7/2009 | Lenz et al. |
| 2011/0037399 A1* | 2/2011 | Hung et al. ................... 315/219 |
| 2011/0084619 A1* | 4/2011 | Gray et al. ................ 315/185 R |
| 2011/0164403 A1 | 7/2011 | Bae |
| 2012/0187855 A1* | 7/2012 | Sakai ............................ 315/192 |
| 2012/0206047 A1* | 8/2012 | Vos ................................ 315/122 |
| 2012/0229030 A1* | 9/2012 | Moskowitz et al. .......... 315/122 |

FOREIGN PATENT DOCUMENTS

| | | |
|---|---|---|
| JP | 2005-259426 | 9/2005 |
| JP | 2006-244848 | 9/2006 |
| JP | 2007-123562 | 5/2007 |
| JP | 2007-299788 | 11/2007 |
| KR | 10-2009-0010269 | 1/2009 |
| WO | WO 2009-138104 | 11/2009 |
| WO | WO 2009-153696 | 12/2009 |

OTHER PUBLICATIONS

Schubert, Light-Emitting Diodes, pp. xi-ix, 2003.

Zhou, "Quasi-Active Power Factor Correction Circuit for HB LED Driver", IEEE Transactions on Power Electronics, May 2008, vol. 23, No. 3, pp. 1410-1415.

Johnston et al., "Solid State Light with Optical Guide and Integrated Thermal Guide", U.S. Appl. No. 12/535,203, filed Aug. 4, 2009.

* cited by examiner

TRANSISTOR LADDER NETWORK FOR DRIVING A LIGHT EMITTING DIODE SERIES STRING

BACKGROUND

A string of multiple light emitting diodes (LEDs) in series can be directly AC driven from a standard AC line power source. However, such directly driven LED string exhibits significant harmonic distortion, which is undesirable. Also, the dimming capability is comprised. The LED string can alternatively be DC driven, which requires conversion electronics to convert a standard AC power source into DC current. Therefore, a modification or improvement is desirable to allow a sufficient current flow for low drive voltages with minimum harmonic distortion and near unity power factor resulting in an implementation allowing dimming capability, particularly as LED lights replace incandescent and fluorescent lamps.

SUMMARY

A first circuit for controlling operation of a string of LEDS, consistent with the present invention, includes a number of sections connected in series and configured for connection to a power source. Each section includes one or more LED junctions, a variable resistive element coupled to the LED section, and a switch coupled to the variable resistive element and the LED section. The switch with the variable resistive element controls activation of the LED section. When receiving power from the power source, the sections are activated in sequence throughout the series of sections.

A second circuit for controlling operation of a string of LEDs, consistent with the present invention, also includes a number of sections connected in series and configured for connection to a power source. Each section in the second circuit includes one or more LED junctions, a variable resistive element coupled to the LED, a transistor coupled to the variable resistive element, a switch coupled to the LED section, the variable resistive element, and the transistor. The switch with the variable resistive element and transistor controls activation of the LED section. When receiving power from the power source, the sections are activated in sequence throughout the series of sections.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the LED driving circuits allow driving multiple LEDs in series in AC line applications with minimal harmonic distortion in drive current and near unity power factor. The circuits also allow direct dimming as well as color variation with a dimmer circuit, for example a conventional TRIAC dimmer. Furthermore, the circuitry has line voltage surge protection capability and a relative insensitivity to undervoltage operation.

Figure 1:
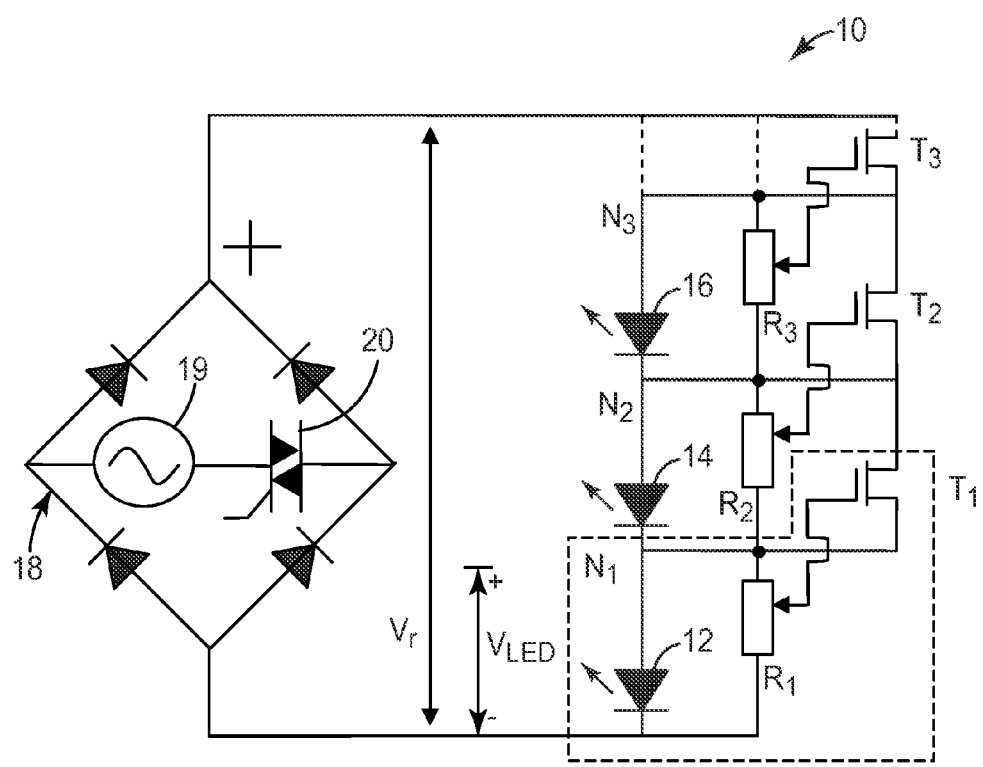
FIG. 1 is a diagram of a single FET circuit (in the dashed box) for driving an LED series string.

FIG. 1 is a diagram of a FET circuit 10 for driving an LED series string. Circuit 10 includes a series of three (m=3) sections $N_1$, $N_2$, and $N_3$ connected in series. Each section controls $N_m$ LED junctions. The first section includes $N_1$ LED junctions 12 depicted as one diode, a resistor $R_1$, and a transistor $T_1$. The second section includes $N_2$ LED junctions 14 depicted as one diode, a resistor $R_2$, and a transistor $T_2$. The third section includes $N_3$ LED junctions 16 depicted as one diode, a resistor $R_3$, and a transistor $T_3$. In each section, the depletion transistor T functions as a normally-on switch in order to activate or de-activate (turn on or off) the corresponding LED section. A requirement for the depletion transistors is that the drain-source channel resistance $R_{ds}$ is at most a few ohms for zero gate-source voltage, $V_{gs}=0$. The transistors form a ladder network in order to activate the LEDs in sequence from the first section ($N_1$) to the last section ($N_3$) in FIG. 1. The sections $N_1$, $N_2$, and $N_3$ are connected to a rectifier 18 including an AC power source 19 and a dimmer circuit 20. In FIG. 1, the dimmer circuit 20 is depicted as a TRIAC but can also be based on other line phase cutting electronics. In a practical 120 VAC case there are preferably more than three sections, possibly ten or twenty sections to bring the section voltage into the practical 10 to 20 volt range.

Switch transistors $T_1$, $T_2$, and $T_3$ can each be implemented by depletion MOSFETs, for example a BSP 149 transistor. Resistors $R_1$, $R_2$, and $R_3$, can each be implemented with 50 kΩ potentiometers, for example, or other types of variable resistive elements. LEDs 12, 14, and 16 can each be implemented with any type of LED of different color emission but with preferably the same current rating.

Circuit 10 in FIG. 1 operates as follows. The first (lower) $N_1$ section will illuminate at a small drive voltage $V_r$ because the FET channels in series form a low resistance path. A potentiometer value R is a sum $R=R_t+R_b$ with $R_t$ the top value above the runner and $R_b$ the value below the runner. Applying this to the $R_1$ potentiometer, the gate-source voltage $V_{gs}$ of $T_1$ is given by equation (1):

$$V_{gs} = -\frac{R_t}{R_t + R_b} V_{LED} \qquad (1)$$

According to equation (1), $V_{gs}$ decreases for increasing LED voltage. For ever increasing section LED voltage ($V_{LED}$), transistor $T_1$ will no longer serve as the main current supply path when its $V_{gs}$ value becomes less than a threshold voltage, because the second $N_2$ LED section will gradually conduct the same current as the first $N_1$ section and will start to illuminate. For further increasing $V_r$ voltage this process cascades to the third and possibly higher LED sections. This cascading process accomplishes a linearization of the resistive LED load. In FIG. 1, only three sections are shown, but the ladder can be extended to any m sections with a number of $N_m$ LED junctions for each section m that is consistent with the maximum $V_r$ drive voltage where the total number of LED junctions is given by the product $N_m \times m$. Also, each section can contain more than one LED junction as shown with preferably at least three LED junctions in each section. Multiple LED junctions can be contained in a single LED component or among several LED components. The final transistor $T_m$ (transistor $T_3$ in FIG. 1) serves as the ultimate line voltage surge protector that limits the LED current. This current limit is visible as the maximum plateau in FIG. 4 and in FIG. 6.

During extreme line power consumption, an undervoltage situation can occur that may lead to one or more upper LED sections not being illuminated. The remaining sections however remain illuminated at their rated currents so that undervoltage situations have a limited effect on the total light output.

Figure 2:
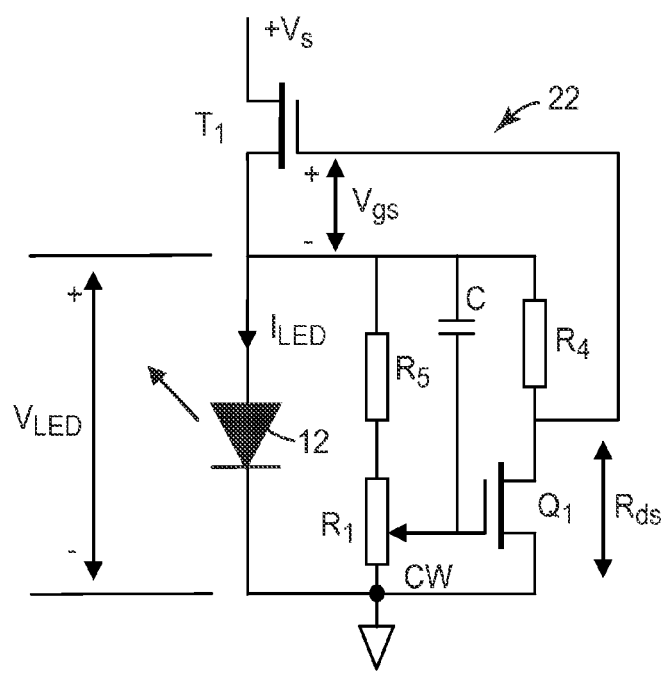
FIG. 2 is a diagram of a dual FET circuit for driving an LED series string, this circuit being an improvement of the dashed box circuit in FIG. 1.

A modified electronics portion for a single (the first) LED section is shown by a dual FET circuit 22 in FIG. 2. Compared to circuit 10 shown in FIG. 1, one additional enhancement FET $Q_1$ and two additional resistors $R_4$ and $R_5$ and one capacitor C are included for each LED section $N_1$ to $N_m$. FET $Q_1$ can be implemented with, for example, a 2N7000 transistor. Resistors $R_4$ and $R_5$ can be implemented with 100 kΩ or so resistors, or other types of resistive elements. The clockwise rotation sense of $R_1$ ("cw" in FIG. 2) is toward higher LED current. The dual FET circuit solves a disadvantage of circuit 10 that manifests itself in several different ways.

The controlled $I_{LED}$ current feedback mechanism involves a voltage gain G in equation (2) with this "gain" being $|G|<1$. This gain was constant in the previous single FET circuit. In the dual FET case, G varies and the $R_{ds}$ involvement of the enhancement (Q) FETs provides an advantage (with the proper choice of $R_1$) in realizing the various performance improvements.

$$G = \frac{V_{gs}}{V_{LED}} = -\frac{R_1}{R_1 + R_{ds}} \quad (2)$$

Figure 3:
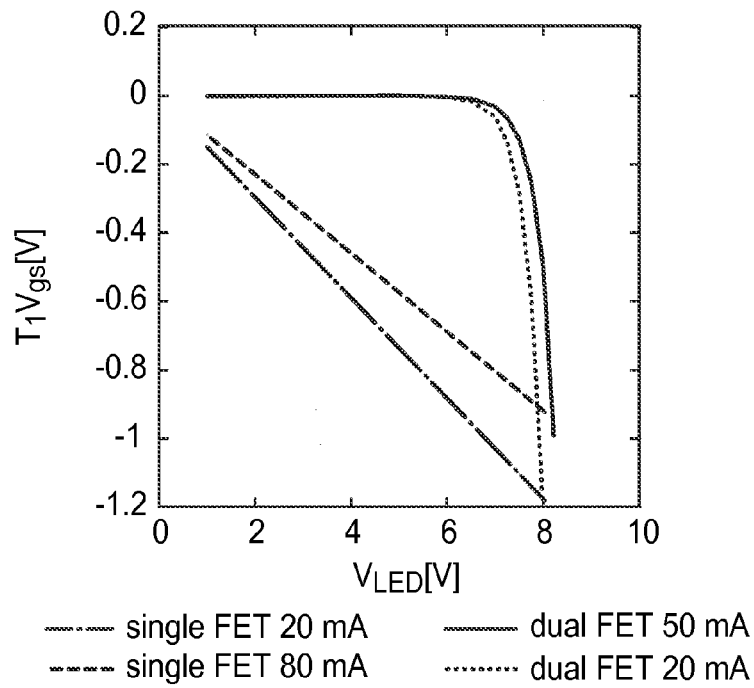
FIG. 3 is a graph illustrating transistor T gate source voltages versus LED voltages for the single and dual FET circuits.

FIG. 3 shows the $T_1$ gate-source voltage versus LED voltage and the marked difference between the single and dual FET realizations. Instead of the gradual decrease in $V_{gs}$ of $T_1$ for the single FET circuit, the dual FET case switches at a higher LED voltage with the $V_{gs}$ decrease showing a sharp edge. At the horizontal portion of the curve, transistor $T_1$ maintains a low $R_{ds}$ resistance to minimize dissipation. As a result, all T-type (depletion) transistors for each LED section act as more perfect switches to turn currents through the LEDs on and off.

Figure 4:
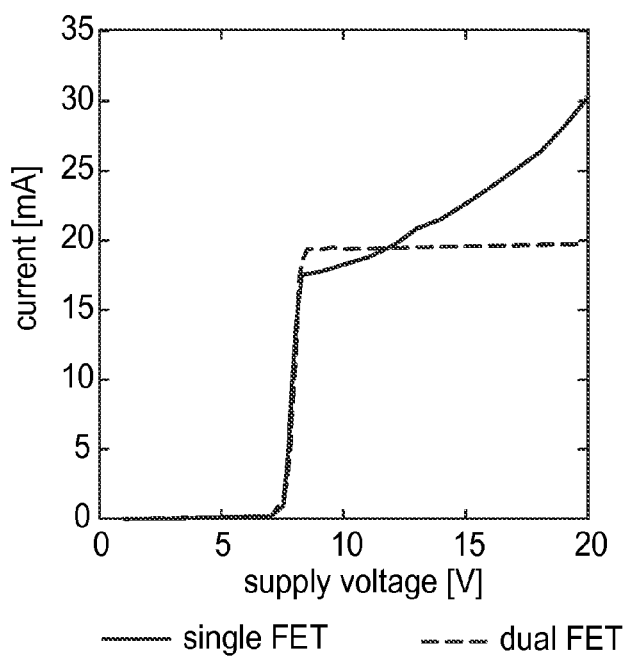
FIG. 4 is a graph illustrating upper current limits for the single and dual FET circuits.

FIG. 4 shows the improved current limiting capability where a more rigid current limit is enforced independent of the supply voltage in the dual FET circuit in comparison to the single FET circuit. With the applied voltage left of the vertical portion in FIG. 4, the LED section is inactive. Right of the vertical portion, the LED section is active and the electronics limit the current flow to the plateau level.

The performance of circuit 22 can further be enhanced by limiting the charging currents of the LEDs. A simplified equivalent LED circuit diagram consists of a parallel connection of a resistor and a capacitance, the latter being primarily composed of the diffusion capacitance of a forward biased diode. This capacitance will draw current when a voltage change is presented to the LED section. These charging currents will be provided by the AC line and will show up as spikes or noise on the ascending branch of the AC current amplitude, see FIG. 4. The discharge is internal to the LED, and the discharge currents will not show up in the AC line current on the descending branch. The spikes on the ascending branch will lead to increased current harmonic content which is undesirable.

A remedy for these current spikes involves the placement of a small capacitor C connected to the gate of enhancement FET $Q_1$, as shown in FIG. 2. This capacitor C in combination with resistors $R_5$ and $R_1$ form a high pass filter that will temporarily increase the channel resistance of the depletion FET $T_1$ when a sudden voltage change is presented to the LED. As a result, the charging current feeding the diffusion capacitance will be temporarily attenuated, reducing the current noise on the ascending branch. Depending on the size of the LEDs used and the values of $R_5$ and $R_1$, a practical value of C is approximately 100 pF.

Figure 5:
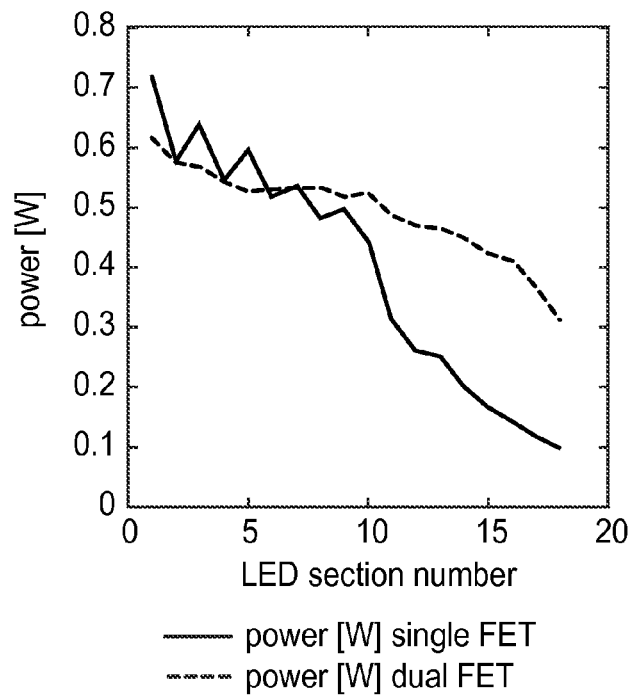
FIG. 5 is a graph illustrating power consumption for the single and dual FET circuits for an eighteen section LED ladder.

Another benefit of the dual FET case is illustrated in FIG. 5 showing a more balanced power consumption than the single FET case. This equalized balance is also clearly visible in the luminous perception of the LED sections where (subjectively) no discernable difference was observed in luminous output for the different LED sections. The graph in FIG. 5 was obtained with an implementation using eighteen LED sections in the ladder with total power consumption of about 10 W. Efficiency numbers obtained from FIG. 5 show a transistor dissipation reduction from 2.6 W in the single FET case to less than 0.5 W in the dual FET case and an efficiency increase from 73% in the single FET case to 95% in the dual FET case. The efficiency is defined as the ratio of the total LED power over the line plug power.

Figure 6:
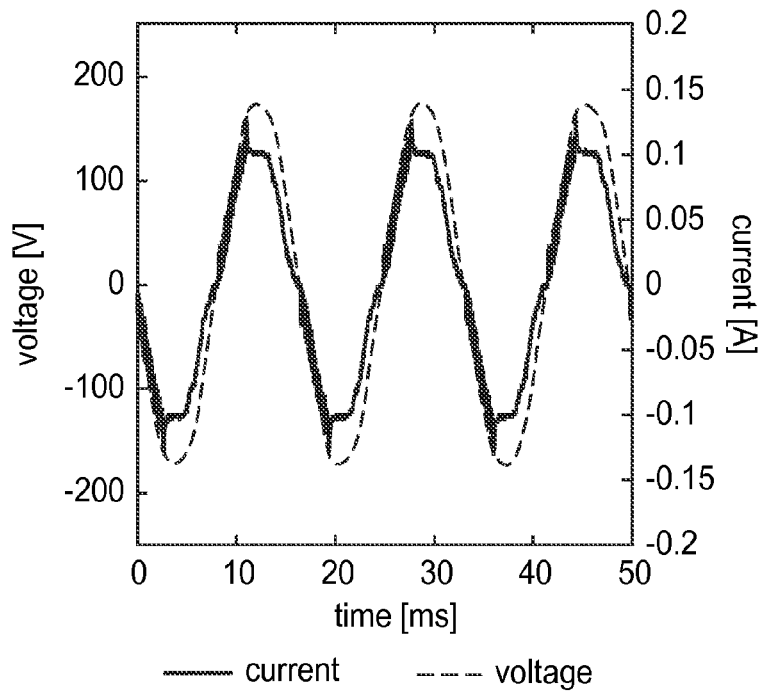
FIG. 6 is a graph illustrating total harmonic distortion and power factor performance for the dual FET circuit.

FIG. 6 is a graph illustrating total harmonic distortion for the dual FET circuit. Both the single and dual FET circuits were shown to exhibit very low total harmonic distortion. Furthermore, the ladder network was shown in both the single and dual FET circuits to approximate a linear load profile of current versus voltage.

Figure 7:
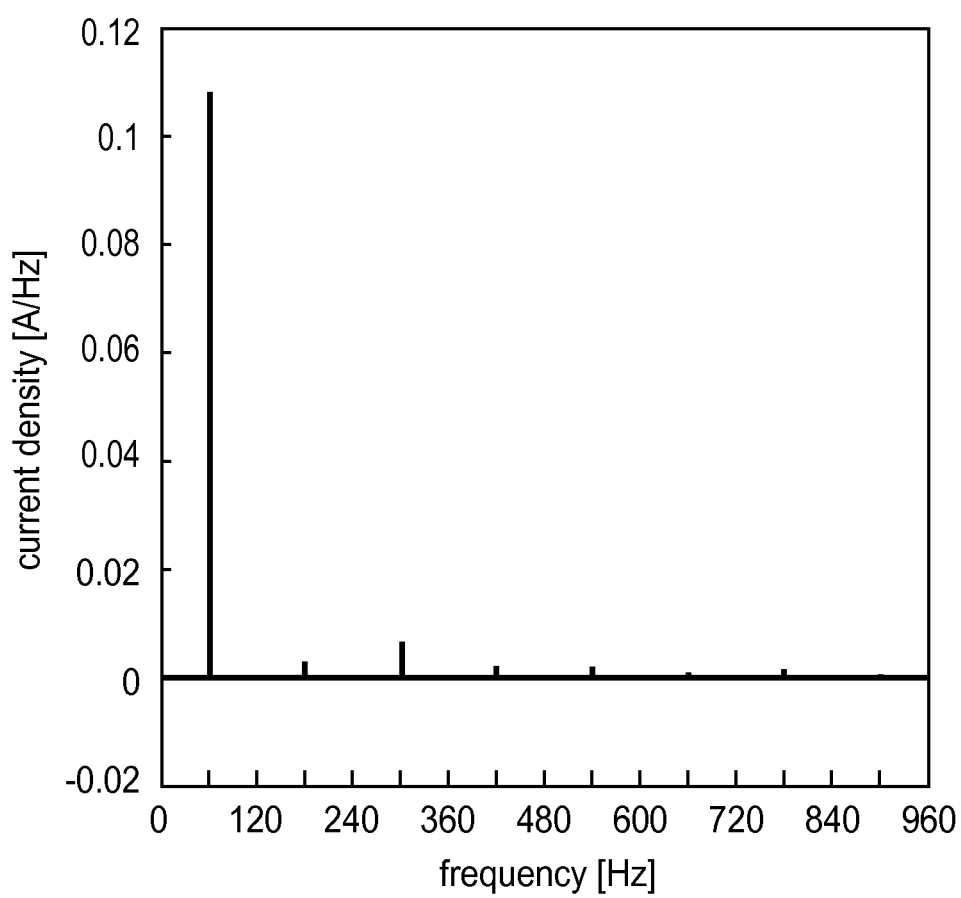
FIG. 7 is a graph illustrating a current spectrum for the dual FET circuit.

FIG. 7 is a graph illustrating a current spectrum for the dual FET circuit showing very low harmonics, resulting in a total harmonic distortion of 0.7% for a particular implementation of the dual FET circuit. The spectrum in FIG. 7 was obtained by collecting a digitized profile of the line current I(t) over exactly one period of 1/60 s. To this profile was added j times the Hilbert transform of I(t) with $j=\sqrt{(-1)}$. The fast Fourier transform was then taken of this complex sum, resulting in the one-sided spectrum in FIG. 7.

The ladder network has dimming capability with dimmer circuit 20, which provides for activation of only a selected number of sections of the ladder. This selected number can include only the first section ($N_1$), all sections ($N_1$ to $N_m$), or a selection from the first section ($N_1$) to a section $N_{m-n}$ where n<m. The intensity (dimming) is controlled based upon how many sections are active with the LEDs turned on with a particular intensity selected by the dimmer circuit that controls what number of sections in the ladder are activated.

The ladder network also enables color control through use of dimmer circuit 20. The color output collectively by the LEDs is determined by the dimmer controlling which sections are active, the selected sequence of sections, and the arrangement of LEDs in the sections from the first section to the last section. As the ladder turns on in sequence, the arrangement of the LEDs determines the output control color with colors 1, 2, . . . m correlated to the color of the LEDs in sections $N_1, N_2, \ldots N_m$. The output color is also based upon color mixing among active LEDs in the selected sequence of sections in the ladder.

The circuitry leads to outstanding power factor performance. The power factor PF is evaluated using the general formula for line voltage V and current I shown in equation (3), with T covering an exact integer number of periods and τ arbitrary:

$$PF = \frac{\int_{\tau}^{\tau+T} V \times I \, dt}{TV_{rms}I_{rms}} \quad (3)$$

With the circuitry of the ladder network, power factors of 0.98 or better are easily obtained.

The components of circuits 10 and 22, with or without the LEDs, can be implemented in an integrated circuit. For separate LEDs, leads connecting the LEDs enable the use as a driver in solid state lighting devices. Examples of solid state lighting devices are described in U.S. patent application Ser. No. 12/535,203 and filed Aug. 4, 2009, which is incorporated herein by reference as if fully set forth.

The terms single FET and dual FET are used as labels only, and equivalent circuit components can alternatively be used to control the LEDs using the transistor ladder network.

The invention claimed is:

1. A circuit for controlling operation of a string of light emitting diodes (LEDS), comprising:
   a number of sections connected in series, the sections being configured for connection to a power source, wherein each section comprises:
   at least one LED;
   a variable resistive element coupled to the LED section;
   a transistor coupled to the variable resistive element; and
   a switch coupled to the LED section, the variable resistive element, and the transistor,
   wherein the switch with the variable resistive element and the transistor activates the LED section and controls current through the LED,
   wherein, when receiving power from the power source, the sections activate the LED sections in sequence throughout the series of the sections,
   further comprising a first resistive element coupled between the switch and the variable resistive element and a second resistive element coupled between the switch and the transistor.

2. The circuit of claim 1, wherein the transistor comprises an enhancement FET.

3. The circuit of claim 1, wherein the switch comprises a transistor.

4. The circuit of claim 3, wherein the switch comprises a depletion FET.

5. The circuit of claim 1, wherein each section includes a plurality of LED junctions.

6. The circuit of claim 1, further comprising a rectifier coupled with the series of sections and configured for connection to the power source.

7. The circuit of claim 6, further comprising a dimmer circuit coupled to the rectifier, wherein, when receiving power from the power source, the dimmer circuit controls activation of a selection of one or more of the sections in order to activate in sequence the LEDs in the selected sections.

8. The circuit of claim 7, wherein the dimmer circuit comprises a TRIAC.

9. The circuit of claim 7, wherein the dimmer circuit comprises phase cutting electronics.

10. A circuit for controlling operation of a string of light emitting diodes (LEDS), comprising:
    a number of sections connected in series, the sections being configured for connection to a power source, wherein each section comprises:
    at least one LED;
    a variable resistive element coupled to the LED section;
    a transistor coupled to the variable resistive element; and
    a switch coupled to the LED section, the variable resistive element, and the transistor,
    wherein the switch with the variable resistive element and the transistor activates the LED section and controls current through the LED,
    wherein, when receiving power from the power source, the sections activate the LED sections in sequence throughout the series of the sections,
    further comprising a capacitor coupled between the switch and the transistor.

11. The circuit of claim 10, wherein the transistor comprises an enhancement FET.

12. The circuit of claim 10, wherein the switch comprises a transistor.

13. The circuit of claim 12, wherein the switch comprises a depletion FET.

14. The circuit of claim 10, wherein each section includes a plurality of LED junctions.

15. The circuit of claim 10, further comprising a rectifier coupled with the series of sections and configured for connection to the power source.

16. The circuit of claim 15, further comprising a dimmer circuit coupled to the rectifier, wherein, when receiving power from the power source, the dimmer circuit controls activation of a selection of one or more of the sections in order to activate in sequence the LEDs in the selected sections.

17. The circuit of claim 16, wherein the dimmer circuit comprises phase cutting electronics.

18. The circuit of claim 16, wherein the dimmer circuit comprises a TRIAC.

* * * * *